Figure 1:
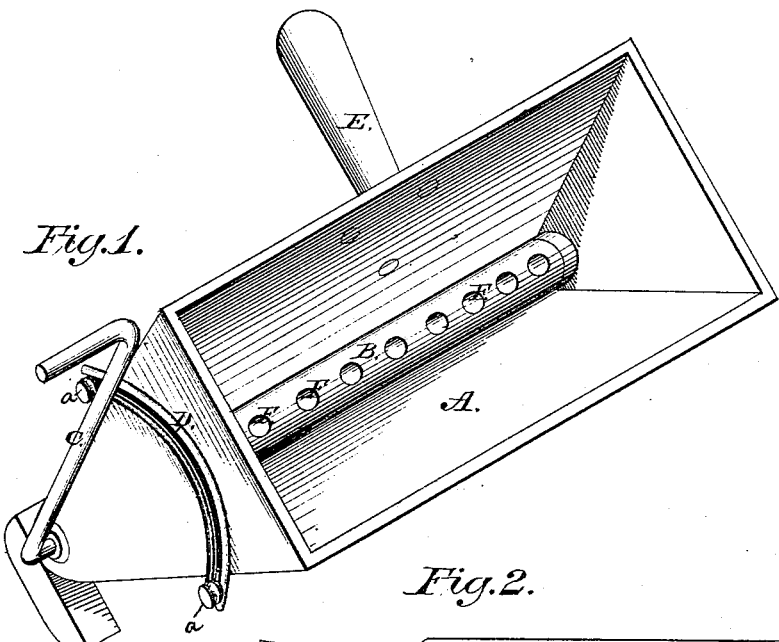
Figure 2:
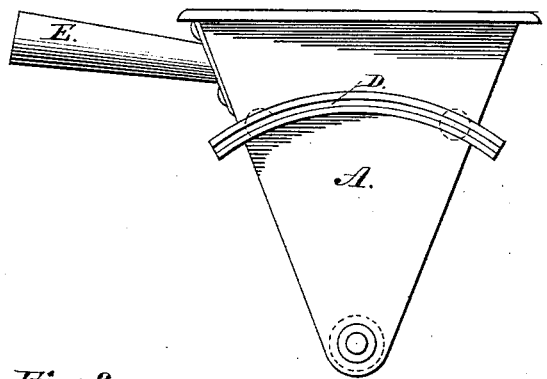
Figure 3:
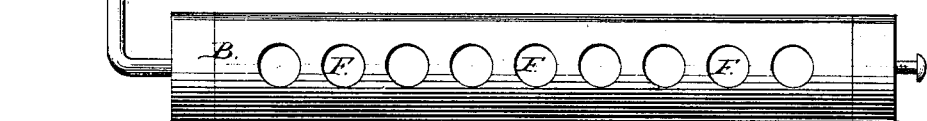

G. SMITH, dec'd.
G. SMITH & ELIZABETH SMITH, Adm'rs.
Cream-Dropping Machines for Confectionary.

No. 166,644.                                Patented Aug. 10, 1875.

Attest:                                     Inventors:

UNITED STATES PATENT OFFICE.

GEORGE SMITH AND ELIZABETH SMITH, OF CINCINNATI, OHIO, ADMINISTRATORS OF GEORGE SMITH, SR., DECEASED.

IMPROVEMENT IN CREAM-DROPPING MACHINES FOR CONFECTIONERY.

Specification forming part of Letters Patent No. 166,644, dated August 10, 1875; application filed March 17, 1875.

*To all whom it may concern:*

Be it known that GEORGE SMITH, Sr., late of Cincinnati, Ohio, invented a Cream-Dropping Machine for the Manufacture of Confections.

The following is a full, clear, and exact description of the construction and operation of the same, with some of its principal advantages, reference being had to the annexed drawings, making a part of this specification, and to the letters and figures of reference marked thereon.

This invention relates to cream-dropping machines; and it consists in the employment of a box provided with a perforated bottom, in connection with a perforated roller operated by a crank, as will be hereinafter more fully set forth.

The perspective view gives a general view of the machine, showing the hopper, marked A, into which the material for dropping is placed; the roller, marked B, placed at the bottom of the hopper, by whose action the material passes into the chambers or holes marked F, from which it drops into molds of any shaped figures required that may be prepared for their reception; the crank, marked C, which gives the required motion to the roller; the gage-slide, marked D, which limits the action of the roller, thus enabling the manufacturer to form any size drop required; and handle, marked E, which is as a convenience in working the machine.

The other figures are for the purpose of showing the same parts in other positions.

The machine may be made of any suitable material and any size required.

The advantages claimed are numerous and self-evident. A much greater quantity of material can be used at the same time, with less labor to the operator, by running the machine along the trays on the rollers attached to the bottom. By increasing the number of holes in the roller one man will be enabled to drop ten times as much cream-work in the same time as is required by the ordinary funnel now in use, and at the same time the work will be more accurate, and the drops more uniform in size. By the action of the roller it receives pressure and material from both sides of the hopper, thus preventing any air from getting into the chambers of the roller, from which cause the work is made more solid and the casts perfect; while, by regulating the gage-slide, the casts may be altered in sizes, so as to produce a greater variety of stock for the market.

We claim—

In a cream-dropping machine, the box A, provided with a perforated bottom, in combination with the perforated roller B, crank C, gage-plate D, and set-screws *a a*, provided with nuts at their ends, substantially as described, and for the purpose set forth.

In testimony whereof we have, as administrators of said GEORGE SMITH, Sr., hereunto subscribed our names in the presence of two witnesses.

GEORGE SMITH,
ELIZABETH SMITH,
*Administrators.*

Attest:
J. B. CONKLIN,
C. E. ARNOLD.